Patented Nov. 12, 1929

1,735,526

UNITED STATES PATENT OFFICE

BURTON C. COONS, OF ROCHESTER, NEW YORK, ASSIGNOR, BY MESNE ASSIGNMENTS, TO COONS APPLE CORPORATION, OF GATES, NEW YORK, A CORPORATION OF NEW YORK

CANNED SLICED APPLES AND PROCESS OF CANNING THE SAME

No Drawing.  Application filed May 23, 1927. Serial No. 193,742.

The present invention relates to canned sliced apples and processes of canning the same. An object of the invention is to provide a drainless non-waterlogged can of sliced apples. Another object of the invention is to provide a can of sliced apples having the tart or natural flavor of the original apples. Still another object of the invention is to provide a solid pack of canned sliced apples free from liquid drain. A further object of the invention is to provide for canning sliced apples so that it will be unnecessary to introduce any material amount of hot liquid into the cans just prior to the sealing thereof. A still further object of the invention is to provide a can of sliced apples in which the apple pieces will after remaining in the cans for an extended period still retain a large portion of their original air cells, so that when baked in pies or pastries the air will be driven out of the air cells and the air cells will be filled with the flavoring or seasoning material introduced into the pies or pastry, avoiding the flat after taste so common in canned apples. Another and still further object of the invention is to so treat the apples before the sealing of the can that, when the can is sealed, it may notwithstanding the size thereof be heated at the center to a temperaure of 185 degrees without causing the apple pieces to lose their original shapes. Still another and further object of the invention is to heat the apple pieces throughout their bodies to an equal temperature, so that, after the sealing, there is no readjustment of the temperatures within the can, producing swells or pin holes in the event of incomplete cooking, or requiring the sealed can to be heated to a point where the structures of the apple pieces will break down wholly or partially making an applesauce condition. A still further object of this invention is to provide a process of canning a solid packed apple without any danger of swells or pin holes.

To these and other ends, the invention consists of a novel canned sliced apple and of steps and combinations of steps in a canning process all of which will be hereinafter described and more particularly pointed out in the appended claims.

Canned sliced apples prior to this invention have been at a disadvantage as compared with fresh apples for two main reasons. The first and probably the most important of these reasons is that the canned sliced apple does not have the flavor of the fresh apple, and the second reason and one of the causes for the first objection is that, in canning the apples, it has been customary to waterlog the apple pieces before they enter the can, or to load the can with a watery tasteless liquid, adding to the cost of canning, storing and shipping, and, at the same time, water logging the apple pieces by filling their air cells with tasteless liquid which gives to the pies a watery condition and a flat taste and prevents the apple pieces, when baked in pies or pastries, absorbing the sweetening and flavoring materials introduced into the pies or pastries.

A number of species of apples, as for instance, the greenings and the Baldwin, both grown extensively in New York State, have a tart apple flavor or taste which is considered of importance to many pie consumers. This tart taste or flavor about January 1st begins to leave a fresh apple and, when the next season's bloom or blossom appears, has entirely disappeared. Canning processes prior to this invention have destroyed this tart apple flavor due to many causes, the main ones being the steaming of the apple pieces during the process, and the waterlogging or filling of the air cells of the apple pieces with the tasteless liquid hereinbefore mentioned. The steaming process is generally employed for sterilizing the apple pieces and for bringing them up to the proper temperature for cooking after the cans are sealed, whereas the waterlogging of the apple pieces has been due to a number of causes.

Two processes are today in most common use among apple canners. One of these which is known as the vacuum process consists in drawing the air from the air cells of the apple pieces and then loading or filling the air cells, while the apple pieces are in a vacuumized condition, with a tasteless liquid producing a water logged condition in the can of apples, thus destroying the tart flavor or taste and, at the same time preventing the apple pieces, when baked in pies or pastries, absorbing the seasoning and flavoring material introduced into the pies or pastries, and furthermore darkening the pies and giving to the pies or pastries a watery condition.

According to the other process, the sliced apples are first steamed to sterilize them. This steaming partially removes the tart flavor. The apples are then placed in cans and just before sealing, a hot liquid is introduced to bring up the temperature of the contents of the cans and also to fill all space in the cans not occupied by apple pieces. The amount of this hot liquid introduced into a can just prior to the sealing has been considerably large with reference to the solid contents of the can, for, with this process, if the solid contents are increased beyond a certain amount with reference to the liquid contents, then on one hand if the pieces are not cooked enough there will be developed swells or pin holes or other bacteria conditions in the can destroying the product, or on the other hand, the apple pieces must be cooked after sealing for such a length of time that they are wholly or partially reduced to an apple sauce condition. The steaming process to which the pieces are subjected before being placed in the can only heats the exterior portions of the apple pieces leaving them in a cooler condition at their centers. The pieces when placed in the can and seated readjust their temperatures and if the percentage of solid contents is too great as compared with the hot liquid contents, the temperature of the can contents will be materially reduced. The result is that, if the can is cooked long enough in the cooking process to bring up the center of its contents to the proper temperature for preservation, the outside pieces will be reduced to an applesauce condition, whereas, if the contents at the center of the can are not brought to the proper temperature, then swells or pin holes will be produced, causing a complete loss of the product.

Canners had therefore decided that for successful canning by any but the vacuum process not above five and one-quarter pounds of sliced apples should be placed in a No. 10 or substantially 1 gallon can. This required the addition thereto of about one and one-half pounds of hot tasteless liquid at the time of sealing with the result that, even though the apple pieces were not waterlogged at the time of sealing, they became waterlogged in the can after a month and there also remained a liquid drain which was thrown away when the can was opened. It is apparent that canning under such conditions is wasteful because the complete capacity of the can is not used, thus requiring for canning a given amount of fruit, more cans, more crates or boxes for the cans, a greater packing expense in the way of labor, and a greater expense in shipping and storing.

According to this invention a can of sliced apples is produced which has no liquid drain; the apple pieces are not water logged but contain a large number of original air cells; the apple pieces still have the tart flavor when baked in pies or pastries this flavor lasting beyond the bloom of the next season; the apple pieces are superior to fresh apples in that they give a tart flavor after the passing of the blossom period of the fresh apple of the next season; the cans can be packed solidly without swells, pin holes or applesauce condition; a greater number of sliced apples can be placed in a given number of cans making the cost of canning and shipping less; and the apple pieces can be brought to uniform temperature throughout so there is no readjustment of the temperature in the pieces after the can is sealed.

In carrying out my invention, the apples are divided into pieces such as quarters, sixths, eighths, twelfths, etc. They are then preferably submitted to a liquid bath substantially at atmospheric temperature for a period of sixteen hours or more. This bath may have introduced therein brine or salt which will have the effect of preventing the discoloring of the apples during the canning process. The sliced apples emerge from the bath with their surface cells filled with the liquid of the bath but the interior air cells are in their natural conditions so that the pieces will, when they come from this bath, not be waterlogged. This bath has two functions, it causes the apples to hold their color and also assists in rendering the apples tough and flexible so that they may be handled without breakage.

The next step is to sterilize the apple pieces without steaming or waterlogging them and, at the same time, to bring the temperatures throughout the body of each piece up to a point where the sealing of the pieces in the container or can can be effected without danger of swells and pin holes, or without causing an applesauce condition on the cooking operation. This result is secured preferably by automatically subjecting the pieces to a bath of hot water between 165° and 180° Fahr., to give them a preliminary heating in order to bring the temperature throughout the body of each piece to 160° Fahr., or above, the pieces being maintained in the bath for three to six minutes depending on the firmness of the fruit. This hot preheating bath does not give to the pieces a sufficiently high temperature for sealing in the can but this temperature cannot be obtained by a long bath of materially hotter water as the outside of the pieces will turn to applesauce, so it is necessary to still further heat them in a hotter bath for a shorter period in order to bring up the temperature to the desired degree. Therefore, the pieces immediately after this preheating bath and while still substantially 160° Fahr. or above are subjected to a second hot bath preferably of water for a period of 30 seconds to a minute and a half, the temperature of the second bath being from 185° Fahr., to 200° Fahr., depending upon the firmness of the fruit.

The next step is to fill each can with enough apple pieces that a minimum amount of air space is left in the container between the apple pieces. As a result, little or no liquid is required to be placed in the can to fill the air spaces and therefore, the apple pieces do not become waterlogged in the can and maintain their fresh or tart apple flavor and also retain the air cells, so that, when baked in a pie or pastry, spices and sugar will be obsorbed by the apple pieces and a watery pie or pastry will not be obtained. This filling step is accomplished preferably by filling each can loosely with the apple pieces and providing above the can in a suitable hopper or funnel an additional supply. The can and the hopper are agitated after which a plunger is passed through the hopper to force the pieces into the can under pressure. The apple pieces are capable of being forced into the can or receptacle under pressure due to the fact that the three baths have withered or toughened the pieces, making them adapted to being packed in a compact mass without material injury to the structure of the pieces. By this pressure it is possible to place in a Number 10 can from six and one-quarter to six and one-half pounds of sliced apples, and the cans are substantially filled in a solid condition so that little or no liquid is required to be placed in the can before sealing. The cans should be sealed before the temperature of their contents is below 170° Fahr. The two hot baths to which the apple pieces are subjected bring the temperature of each piece throughout its body up to the desired sealing temperature without producing an applesauce condition in the pieces. It follows therefore, that, when these pieces are assembled in a can that the entire contents of the can will have substantially uniform temperature and that there can be no material readjusting of the temperatures in the can after sealing as there would be if each piece did not have a substantially uniform temperature through its body. The cooking process which immediately follows the sealing and before the temperature of the contents are materially below 160° Fahr., but preferably above 170° Fahr., consists in submitting the sealed cans or containers to a boiling water bath for 15 to 30 minutes as under the old process to bring their contents to at least 185° Fahr., preferably 190° Fahr.

In using the expression "sliced apples" it is intended to cover any division of an apple and not solely in the sense of small divisions.

What I claim as my invention and desire to secure by Letters Patent is:

1. A can of sliced cooked apples solidly packed and free from liquid drain, the pieces having such a proportion of the original air cells that when removed from the can they will float in water, the canned product being substantially permanently-keeping and containing substantially its original flavor.

2. The method of canning sliced apples which consists in treating the apple pieces to heat them throughout their bodies to a temperature at least 160° Fahr., while maintaining such a number of the original air cells in the pieces that the latter will float in water after such heating, sealing the pieces in containers while they are at a temperature not materially below 160° Fahr., without introducing any amount of liquid in the containers that will waterlog the apple pieces, and cooking the pieces in the sealed containers.

3. The process of canning sliced applies which consists in subjecting the apples to a preheating liquid bath for a period of time to warm each piece throughout its contents, subjecting the pieces to a hot liquid bath for a period of time to bring each apple piece to a canning temperature without producing an apple sauce condition in the pieces, sealing the pieces in a container while they are not materially below 160 degrees Fahr., and cooking the apples in the container for such a time and a period that the apples will be preserved without producing an applesauce condition.

4. The process of canning sliced apples which consists of subjecting the apples to a preheating liquid bath at a temperature to bring the apple pieces throughout their entire bodies substantially to the temperature of 160° F., subjecting the apple pieces while substantially at such a temperature to a hotter liquid bath of at least 185 degrees F., sealing the pieces in containers before such pieces are at least 160 degrees F., and subjecting apple pieces in the sealed containers to a cooking process at such a temperature and for such a period that an apple sauce condition will not be produced.

5. The process of canning sliced apples which consists in subjecting the apple pieces to a bath to render them tough, subjecting them to two hot liquid baths, the first being at a lower temperature and for a longer period than the second, to bring the temperature of the pieces at least to 185 degrees F., sealing the pieces in containers while they are at least 160 degrees F., throughout their bodies and subjecting the sealed containers to a cooking temperature for such a period as will not produce an applesauce condition.

6. The process of canning sliced apples or quartered apples which consists in subjecting the apple pieces to a liquid bath, subjecting the apples to a bath of boiling water to raise the temperature of the apples and to kill the bacteria, sealing the apples in containers while the temperature of the apples is at least 160 degrees F., throughout, and then cooking the apples in the containers to bring up the temperature of the apples at the center of the container to at least 185 degrees F.

7. The process of canning apples which consists in heating the sliced apples in at least one hot liquid bath to heat the apples throughout their bodies, sealing the apples in containers while heated so that there is no readjustment of temperatures in the containers due to the unequal heating of different portions of the bodies of the pieces, and heating the apples in the sealed containers to a temperature sufficient to preserve the apples in the containers.

8. The process of canning apples which comprises subjecting apple pieces to an unheated brine bath for an extended period of time to make the pieces tougher and more flexible so that they may be subjected to a liquid bath of high temperature without discoloring or breaking down, gradually bringing up the temperature of the pieces through contact with hot liquid to a temperature which when the pieces are sealed in cans will not be substantially below 160° Fahrenheit in any portion of any of the bodies of the pieces, sealing the pieces in the cans before the pieces have dropped in temperature substantially below 160° Fahrenheit in any of the portions of the bodies of the pieces and without introducing an amount of water into the cans which will water-log the apple pieces after cooking, and cooking the apple pieces in the cans after sealing.

BURTON C. COONS.